(12) United States Patent
Ouidir et al.

(10) Patent No.: US 12,202,047 B2
(45) Date of Patent: Jan. 21, 2025

(54) DEVICE FOR ADJUSTING THE DIAMETER OF A GUIDE CHANNEL FOR BARS TO BE MACHINED

(71) Applicant: LNS MANAGEMENT SÀRL, Orvin (CH)

(72) Inventors: Karim Ouidir, Bellmund (CH); Rolf Schaerer, Sutz (CH)

(73) Assignee: LNS MANAGEMENT SÀRL, Orvin (CH)

( * ) Notice: Subject to any disclaimer, the term of this patent is extended or adjusted under 35 U.S.C. 154(b) by 520 days.

(21) Appl. No.: 17/632,895

(22) PCT Filed: Sep. 12, 2020

(86) PCT No.: PCT/EP2020/075576
§ 371 (c)(1),
(2) Date: Feb. 4, 2022

(87) PCT Pub. No.: WO2021/048426
PCT Pub. Date: Mar. 18, 2021

(65) Prior Publication Data
US 2022/0266347 A1    Aug. 25, 2022

(30) Foreign Application Priority Data
Sep. 13, 2019  (EP) ..................................... 19197352

(51) Int. Cl.
*B23B 13/12*    (2006.01)
*B23B 13/08*    (2006.01)

(52) U.S. Cl.
CPC ............ *B23B 13/123* (2013.01); *B23B 13/08* (2013.01)

(58) Field of Classification Search
CPC .............................. B23B 13/123; B23B 13/08
USPC ........................................................ 193/2 C
See application file for complete search history.

(56) References Cited

U.S. PATENT DOCUMENTS

| | | | | |
|---|---|---|---|---|
| 2,619,712 A | * | 12/1952 | Bechler | B23B 13/08 242/615.3 |
| 3,659,691 A | * | 5/1972 | Leutelt | B02C 13/095 193/2 C |
| 4,566,358 A | * | 1/1986 | Ducanis | B23B 13/126 414/431 |

(Continued)

FOREIGN PATENT DOCUMENTS

| DE | 848735 C | 9/1952 |
|---|---|---|
| DE | 7824576 U1 | 3/1983 |

(Continued)

OTHER PUBLICATIONS

International Search Report & Written Opinion in PCT/EP2020/075576 dated Nov. 18, 2020, 11 pages.

*Primary Examiner* — Mark A Deuble
(74) *Attorney, Agent, or Firm* — Tucker Ellis LLP

(57) ABSTRACT

Bar feeder (1) comprising a guide channel (10) centred on an invariable guide axis (A-A), characterised in that the guide channel (10) is adjustable and is formed by an adjustable guide element which can define a guide channel with a constant centre (C) corresponding to a bar diameter comprised between a maximum bar diameter (DMax) in a first position (P1) and a minimum bar diameter (DMin) in a second position (P2) under the action of a device for adjusting the diameter of the guide channel (2).

14 Claims, 6 Drawing Sheets

(56) References Cited

U.S. PATENT DOCUMENTS

| | | | | |
|---|---|---|---|---|
| 1,935,999 | A | * 11/1993 | Tessky | ............... B23B 13/08 |
| | | | | 242/615.3 |
| 5,322,000 | A | * 6/1994 | Huang | ............... B23B 13/08 |
| | | | | 82/127 |
| 9,021,927 | B2 | * 5/2015 | Phillips, II | .......... B23B 5/161 |
| | | | | 82/113 |
| 9,278,417 | B2 | * 3/2016 | Pierce | .................. B26D 3/16 |
| 2023/0373009 | A1 | * 11/2023 | Cucchi | ............. B23B 13/123 |

FOREIGN PATENT DOCUMENTS

| | | |
|---|---|---|
| EP | 3456444 A1 | 3/2019 |
| FR | 2220334 A1 | 10/1974 |
| WO | 1993013901 | 7/1993 |

\* cited by examiner

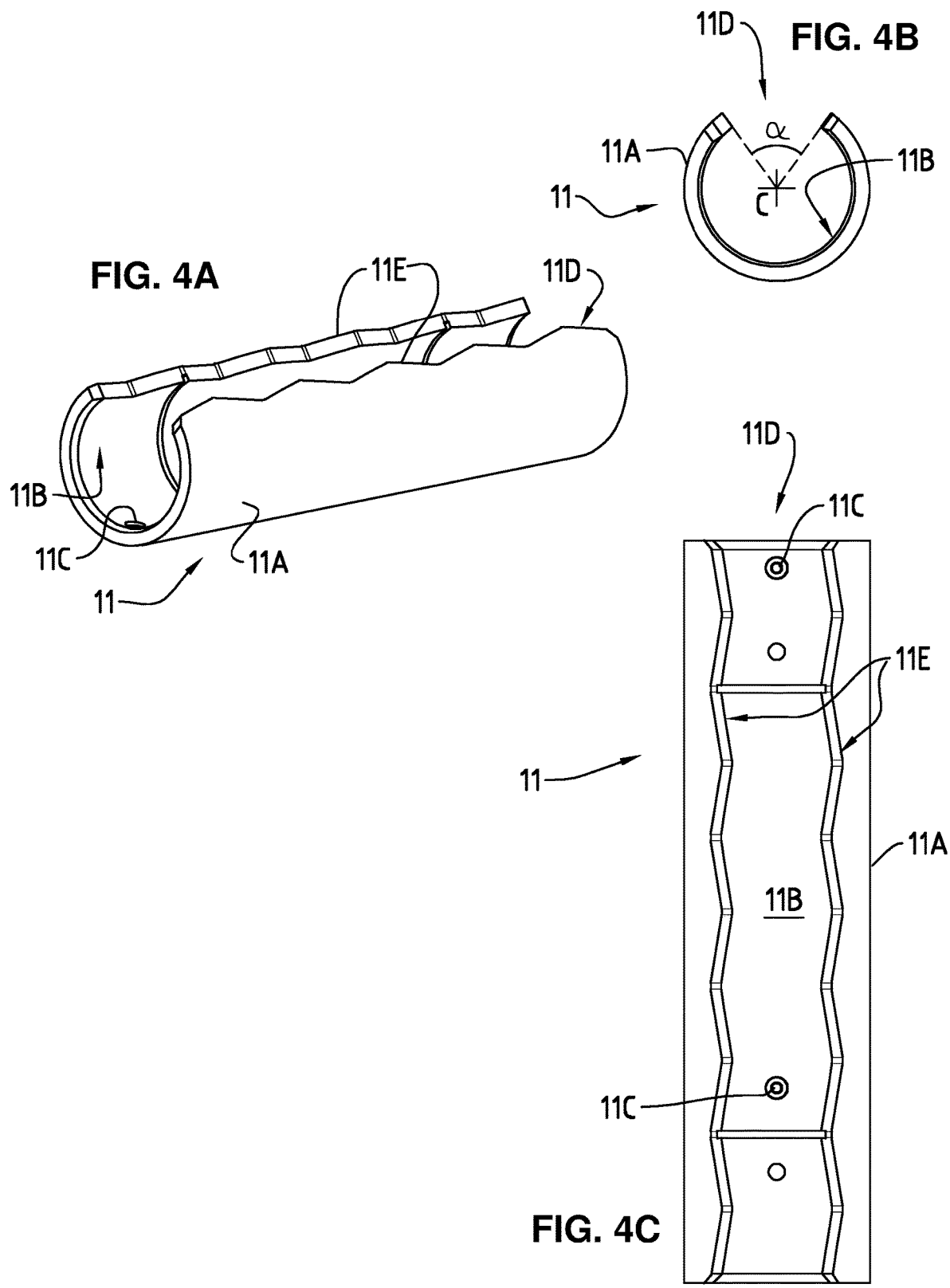

DEVICE FOR ADJUSTING THE DIAMETER OF A GUIDE CHANNEL FOR BARS TO BE MACHINED

TECHNICAL FIELD OF THE INVENTION

The present invention relates to a device and a method for regulating the size of guide elements, for example in a bar feeder, intended to feed these bars into a processing machine, typically a lathe.

BACKGROUND OF THE INVENTION

In the metallurgical industry, bar feeders, also known as bar loaders, are common devices used to feed relatively long bars to a processing machine such as an automatic lathe. As a result, a series of successive parts can be produced at the front end of the bar.

The bars are fed into the automatic lathe with the aid of a bar feeder which has a guide channel adapted to a bar diameter and is usually equipped with a steady rest at its front end, simply usually referred to as front rest. The front rest is the last guide element in contact with the bar before entering the lathe spindle and contains a through hole through which the bar passes, aimed at restricting the vibrations of the bar. The front rest is designed to support the bar, allowing a higher rotational speed than the lathe spindle in terms of revolutions per minute (RPM), and also to confine the bar as securely as possible, minimising vibrations. For this purpose, in order to best dampen the vibrations of the bar, feed tubes or guide elements can be made in shock-absorbing materials such as polyurethane-based plastic or rubber.

The guide channel upstream of the front rest is typically formed by a long channel in the shape of a half pipe provided with a rigid shell adapted to a specific bar diameter, and which can be closed by an upper cover arranged above the pipe.

Such guide elements are therefore not suitable when bars of different sizes and diameters have to be conveyed and the elements forming the guide channel thus have to be replaced, which is both operationally cumbersome and requires storage space to be arranged in order to accommodate a large number of bar diameters.

Alternatively, solutions using V-shaped jaws, commonly referred to as "Toblerones", are also used to grip bars horizontally or laterally and thus adjust more precisely to different diameters. Nevertheless, the disadvantage of such solutions is that they cannot ensure, because of the too small contact and holding surface with the bars, sufficiently effective guidance properties to limit the vibrations of the bars as they rotate.

In order to remedy these problems of modularity and scalability with respect to the diameter of the bars, other solutions using adjustable guide channels have been proposed. Such adjustable channels are formed either by two pivoting jaws with hemicylindrical guide portions brought one against the other or moved away from one another, and whose movement is combined with a height adjustment mechanism to preserve the axis of rotation of the bars, which must remain at constant height level. The solution disclosed in patent document EP3456444 proposes to arrange symmetrically two identical hemicylindrical guide parts above one another, for which several opening and closing positions can be defined in order to be able to adapt to different bar diameters. In both cases, however, the geometrical shape realised for the guide channel consists of a bi-convex spherical lens, which always has the disadvantage of not maximising the guiding surface with the bar.

There is therefore a need, according to the state of the art, for guide elements that can be used in a bar feeder, for example, that are free of these known limitations.

SUMMARY OF THE INVENTION

The present invention is intended to remedy at least a part of the above-mentioned and other disadvantages of guide elements according to the prior art for a guide channel of a bar feeder and/or a front rest for example, making such guide elements suitable in particular for easily accommodating different diameters, shapes or sizes of bars by means of a simple adjustment operation, while maintaining optimal guiding properties.

A further object of the present invention is to further improve the guiding properties imparted and to provide a particularly efficient actuation mechanism for carrying out adjustment operations.

In particular, a first aspect of the present invention is realised by a bar feeder comprising a guide channel centred on an invariable guide axis, characterised in that the guide channel is adjustable and is formed by an adjustable guide element, the adjustable guide element being able to define a guide channel with a constant centre corresponding to a bar diameter comprised between a maximum bar diameter in a first position and a minimum bar diameter in a second position under the action of a device for adjusting the diameter of the guide channel.

Thanks to the use of a single adjustable guide element to realise the guide channel, it is possible to adjust the size of the latter according to a predetermined bar diameter range without having to change the guide part, but instead by performing a simple adjustment operation on one and single same part.

According to a preferred embodiment, the adjustable guide element consists of a flexible shell enveloping the bars.

Thanks to the use of a guide shell made of a flexible material, such as for example polyurethane-based plastic or rubber, it is not only possible to easily adjust the size of the guide channel by always using the same guide part, but also by performing a simple adjustment operation, in contrast with solutions known hitherto. Moreover, it is possible to improve at the same time the guiding properties by maintaining an adapted geometric shape enveloping the bars as close as possible to the contour of the latter, with a limited number of protruding edges, similar for example to the diaphragm of a photographic lens. Vibrations can thus also be reduced for all possible bar diameters.

According to a preferred embodiment of implementation of the invention, the device for adjusting the diameter of the guide channel comprises a clamping device acting on the outer surface of the flexible guide shell. Due to such an arrangement, the actuation mechanism needs to act on only one part, which simplifies implementation thereof. In addition, thanks to the fact that the clamping mechanism, simply controls, as a result, the amplitude of the upper opening of the guide shell, which can roll up on itself until it is reduced to zero, the roundness of the guide channel section is preserved for all diameters.

According to a preferred embodiment of implementation of the invention, the clamping device comprises pivoting rollers resting on the outer surface of the flexible shell, the position of the rollers defining the size of the guide channel and the corresponding bar diameter. The rollers, which rotate around an off-centre axis and are at least two in number, thus simply manage the opening level by acting as a collet.

According to a preferred embodiment of implementation of the present invention, the clamping device furthermore comprises an actuation piston acting on a cam for driving the rollers. The actuation device is thus always designed in a very simple form, with the cam driven in a pivoting movement when the piston is extended. In addition, the fact of having a single cam for actuating all the rollers used for the operation of clamping of the flexible guide shell and as a result of regulating the diameter of the guide channel considerably simplifies the adjustment operation and at the same time improves reliability, since there is no need for synchronisation between the different actuation mechanisms of the different rollers via dedicated cams.

According to a preferred embodiment of implementation of the invention, the drive cam is moreover provided with several actuation slots co-operating with corresponding drive pins arranged on each of the rollers. Thanks to such an arrangement, the pivoting of the cam as a result of the piston movement is transmitted very simply and synchronously to all the rollers simultaneously, without adding any level of complexity to the overall actuation mechanism.

According to a preferred embodiment of implementation of the invention, the number of rollers of the clamping device is even, and the roller drive cam is arranged to rotate half of the rollers in a first direction of rotation, and the other half of the rollers in a second, opposite direction of rotation. Such a configuration allows the clamping function to be intuitively realised by causing the upper edges of the guide shell to move closer to one another without generating at the same time rotation movement of the guide shell on itself.

According to a preferred embodiment of implementation of the invention, said device for adjusting the diameter of the guide channel also comprises an integrated height adjustment system. This way, there is no need to provide a dedicated height adjustment system to keep the centre of the guide channel at a constant level, which is an essential prerequisite for feeding bars in the lathe in output, the position of which is fixed in relation to the bar feeder. The combination of these two diameter adjustment functions while maintaining the centre of the guide channel guarantees the compactness of the proposed system.

According to a preferred embodiment of implementation of the invention, the clamping system comprises at least three rollers and is arranged to constitute jointly the height adjustment system. According to such a configuration, there is no need to provide any elements other than the rollers to allow the flexible shell to act as a diaphragm to manage the diameter of the guide channel: their compression action on the outer surface of the flexible guide shell adjusts the diameter of the guide channel while maintaining its centre.

According to a preferred embodiment of implementation of the invention, the guide channel is further provided with a retaining pin inserted at the base of the flexible guide shell. Such a fixing element for the guide shell allows the guide shell to be prevented from being rotated with the bars.

According to a preferred embodiment of implementation of the invention, the angular sector over which an upper opening of the flexible guide shell extends in the first position corresponding to the maximum bar diameter is comprised between 60 degrees and 90 degrees. Such an angular sector makes it possible not to exceed a predefined stress level in terms of elastic deformation on the flexible guide shell used, and thus to preserve its service life by minimising the risk of long-term creep and shorter-term fracture for harder materials. At the same time, it ensures that the rods are well wrapped in the flexible guide shell—the corresponding complementary sector of the shell being preferably between 270 and 300 degrees—and thus always provides excellent guiding properties.

According to a preferred embodiment of implementation of the invention, the deviation between the maximum bar diameter in the first position and the minimum bar diameter in the second position corresponds to a range of around 20 mm, and a guide insert can be inserted in said flexible guide shell to define a new range of minimum and maximum diameters. Such a configuration allows the adjustment range of the diameter of the guide channel to be increased by steps without having to exert greater constraints on the flexible guide shell, for which the angular sector corresponding to the upper opening can instead remain substantially constant. The number of inserts added thus makes it possible to simply shift the ranges of values of possible diameters while keeping them essentially constant.

According to a preferred embodiment of implementation of the invention, the upper opening of the flexible guide shell also has a profile allowing reciprocal interlocking, such as a sawtooth or corrugated profile. Such a configuration for the flexible guide shell makes it possible to further optimise the contact surface with the bars with an enveloping on almost their entire circumference; the corrugated profile being even more preferred in that it avoids any untimely contact with edges resulting in pinching which could mark the bars and generate vibrations. The guiding properties are thus further improved.

BRIEF DESCRIPTION OF THE DRAWINGS

In the following description, various embodiments of the invention are described with reference to the following drawings:

FIGS. 4A, 4B and 4C illustrate respectively a side, front and top view of a flexible guide shell used according to a preferred embodiment of the present invention, having a corrugated profile at its upper opening.

Figure 1:
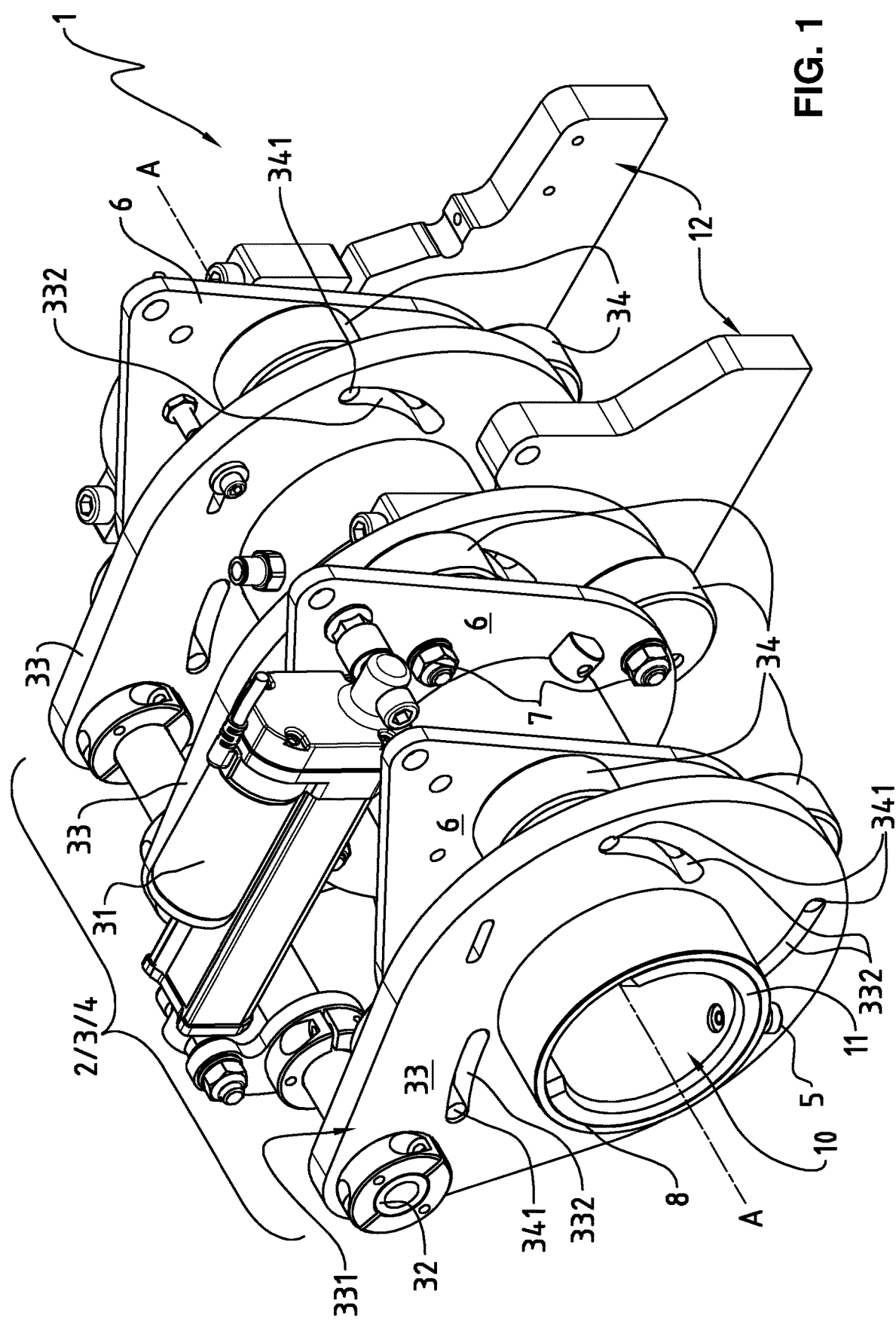
FIG. 1 is a perspective view of a guide channel equipped with the new adjustment device according to the invention.

Where the same reference numerals are used for different drawings, they are intended to refer to similar or corresponding features (for example, a reference numeral used with a suffix is intended to identify a particular part among a certain type of parts). The same reference numerals used in different drawings showing the claimed guide channel diameter adjustment device in different working positions corresponding to different bar diameters will not be explained again in detail in all the following drawings.

DETAILED DESCRIPTION OF THE INVENTION

FIG. 1 shows a perspective view of a bar feeder 1, or here rather a bar feeder segment equipped with a guide channel 10 according to a preferred embodiment of the invention, according to which the adjustable guide element is formed, on a segment by segment basis, by a one-piece flexible guide shell 11 made for example in polyurethane-based plastic or rubber material in order to achieve vibration damping, and which is made integral with a cylindrical frame 8 similar to a front rest by means of a retaining pin 5 inserted at its base. In other words, the bar feeder segment shown could be considered as constituting a front rest itself.

The cylindrical frame 8 of the guide channel 10 is itself arranged on a base plate 12, here formed by several feet, and the device for adjustment of the guide channel diameter 2 consists jointly of a clamping device 3 acting on the flexible guide shell 11 via a series of rollers 34 actuated by a piston 31 via a drive cam 33, and a height adjustment device 4 intended to keep the centre of the guide channel constant, i.e. the guide channel 10 always centred around the guide axis A-A even when the diameter decreases.

More specifically, several stages can be distinguished, here three stages, of the arrangement of a drive cam 33 provided with actuation slots 332 into which are inserted drive pins 341 integral with rollers 34 acting as eccentrics, i.e. parts that can be moved in rotation around axes perpendicular to an anchoring piece 6. In FIG. 1, the end of some of the rotation axes of the rollers is formed by nuts 7, which can be seen in greater detail in FIGS. 3A-3C. Each of the cams 33 pivots under the action of the extension of an actuation piston 31, the end of which is attached to a connecting piece 32, and on the other hand to an upper end of the drive cam 33. The connecting piece 32 thus acts as a hinge between the actuation piston 31 and the drive cam 33.

The actuation piston 31 thus causes, via the connecting piece 32 connected to the series of drive cams 33, a rotational movement of the rollers 34 at the level of each of the stages where the drive cams 33 are arranged. The rollers 34, here preferably 4 rollers 34, are arranged to compress the outer surface of the flexible guide shell 11 in such a way that the shape of the guide channel 10 remains substantially cylindrical, on the one hand, and on the other hand that the centre C of the guide channel 10 is maintained regardless of the degree of opening or closing of the device for adjustment of the diameter of the guide channel 2 conditioned by the stroke of the piston. In other words, the device for adjustment of the diameter of the guide channel 2 is arranged to function similarly to an optical diaphragm, and it is combined with the clamping device 3, which is intended to carry out the diameter adjustment, and the height adjustment system 4, this height adjustment being carried out simultaneously by the rollers 34. This is possible because there are 4 rollers per drive cam stage 33, with the main function of the two upper rollers 34 being diameter adjustment, while the two lower rollers 34 allow the raising of the base of the flexible guide shell 11. However, according to a variant not illustrated, it could be foreseen that a series of two rollers 34 would be responsible for carrying out the diameter adjustment—thus forming part of the clamping device 3—while a separate height adjustment system 4 would then be provided independently to raise the base of the flexible guide shell 11 synchronously, depending on the degree of opening or of closing of the guide channel 10.

Figure 2A:
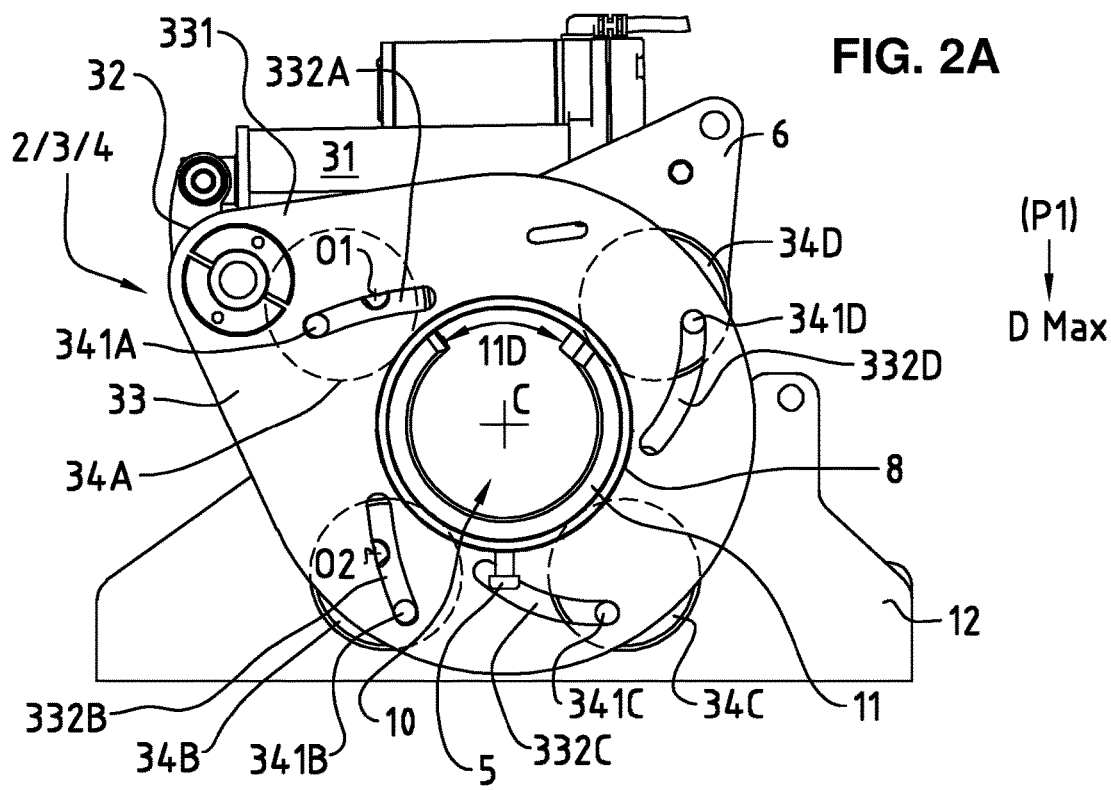
FIGS. 2A, 2B and 2C consist of a front view of the adjustment device according to a preferred embodiment of the present invention, respectively in the open, intermediate and closed position.

The mechanism for adjusting the diameter according to this preferred embodiment is described in greater detail in FIGS. 2A to 2C below. FIG. 2A shows a front view of the device for adjustment of the diameter of the guide channel 2, combined in one piece with the clamping device 3 and the height adjustment system 4. The position illustrated corresponds to the first position P1, referred to as open because an upper opening 11D is present at the level of the guide shell 11, which is here in its nominal rest position corresponding to the maximum possible diameter $D_{Max}$ for guide channel 10, from which, compared to FIG. 1, the guide axis A-A can no longer be distinguished but simply the centre C.

Figure 2B:
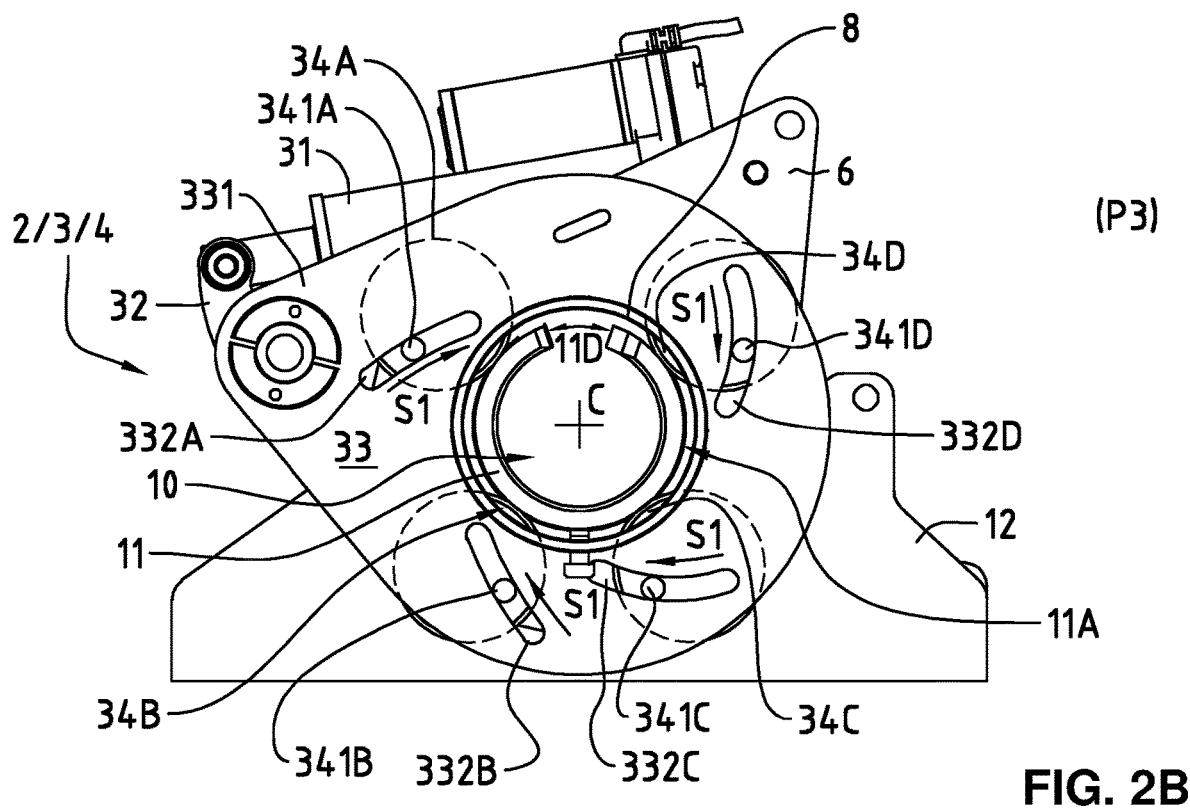
Figure 2C:
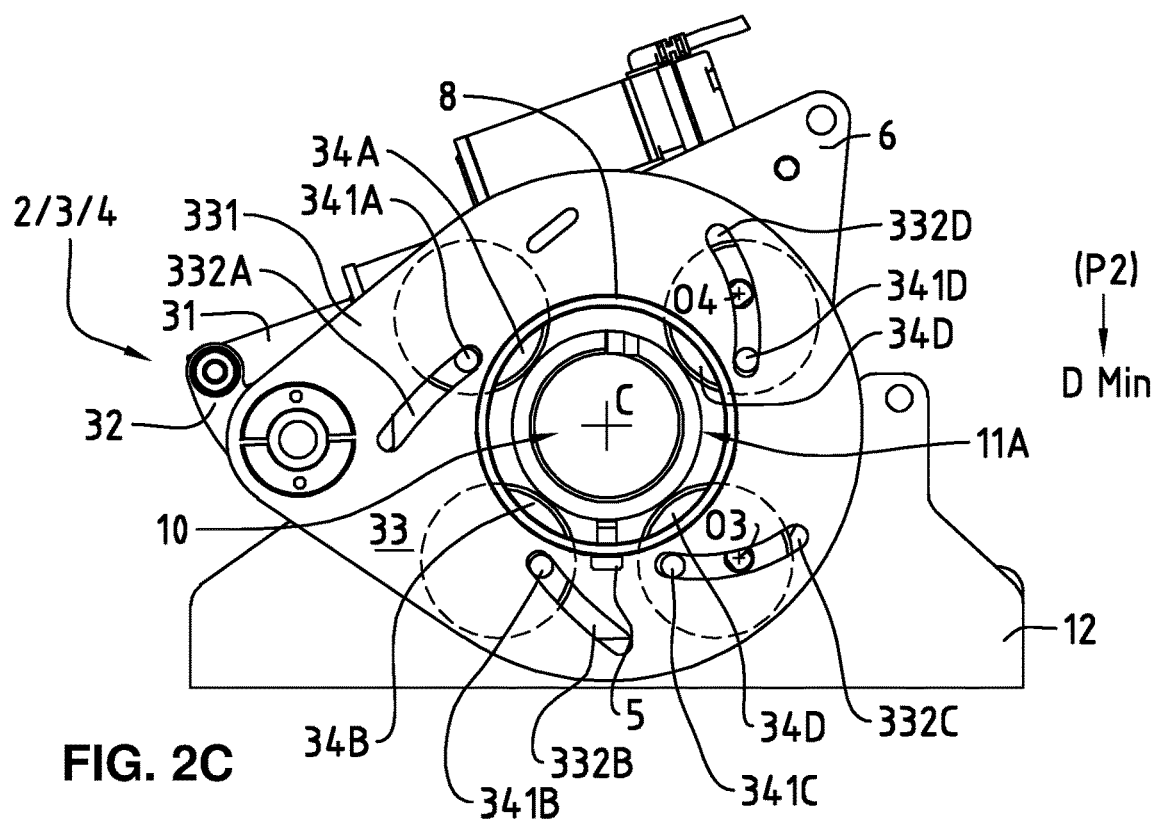

In all FIGS. 2A, 2B, and 2C, each of the four rollers 34, their corresponding drive pins 341 and the actuation slots 332 of the drive cam 33 used by the clamping mechanism 3 are labelled individually, i.e.:

The first roller 34A, above left, on which the first drive pin 341A is arranged, inserted in the first actuation slot 332A;

The second roller 34B, below left, on which the second drive pin 341B, inserted in the second actuation slot 332B, is arranged;

The third roller 34C, below right, on which the third drive pin 341C, inserted in the third actuation slot 332C, is arranged;

The fourth roller 34D, above right, on which the fourth drive pin 341D, inserted in the fourth actuation slot 332D, is arranged.

In FIG. 2A, each of the first drive pin 341A, second drive pin 341B, third drive pin 341C, and fourth drive pin 341D is positioned respectively at the level of one end of the first actuation slot 332A, the second actuation slot 332B, the third actuation slot 332C and the fourth actuation slot 332D. All other reference numerals are otherwise identical to those in FIG. 1.

In the first position P1 corresponding to the maximum diameter $D_{Max}$, the upper opening 11D of flexible guide shell 11 extends over its maximum angular sector, which will be able to be reduced as the clamping device 3 is actuated. In this position, it can be seen that the flexible guide shell 11 rests on the cylindrical frame 8.

In FIG. 2B, the guide channel 10 is in an intermediate position, referred to as third position, corresponding to a bar diameter smaller than the maximum diameter $D_{Max}$ of the first position P1, but still larger than the minimum diameter $D_{Min}$, which can be found in the second position shown in FIG. 2C below. In this intermediate position of the guide channel 10, the actuation piston 31 has caused the pivoting of the drive cam via the connecting piece 32, and all the pins (i.e. first drive pin 341A, second drive pin 341B, third drive pin 341C, fourth drive pin 341D) have moved into their respective actuation slots (first actuation slot 332A, second actuation slot 332B, third actuation slot 332C, fourth actuation slot 332D) in clockwise direction S1. This movement of the pins into the slots causes at the same time the rotation of the rollers, i.e. first roller 34A, second roller 34B, third roller 34C, fourth roller 34D, in relation to their respective axis of rotation (NB: in FIG. 2A, only the first axis of rotation O1 of the first roller 34A and the second axis of rotation O2 of the second roller can be seen, while in FIG. 2C, only the third axis of rotation O3 of the third roller 34C and the fourth axis of rotation O4 of the fourth roller 34D can be seen. However, all these axes are represented in FIGS. 3B and 3C described below). Comparing FIG. 2A with FIG. 2B, it can be seen that the upper opening 11D of the flexible guide shell 11 has been reduced, and that a part of the rollers 34A, 34B, 34C and 34D protrude towards the interior of the cylindrical frame 8, in such a way that they come to rest against the outer surface 11A of the flexible guide shell 11 to compress it towards the inside and reduce the diameter provided by the guide channel 10.

FIG. 2C corresponds to the closed position, i.e. where the flexible guide shell 11 of the guide channel 10 is completely closed with no longer upper opening 11D, the two upper edges of the shell being brought into contact against one another to reduce the diameter to its minimum level. In this second position P2 corresponding to the minimum diameter of bars $D_{Min}$ to be guided, it can be seen that each of the first drive pin 341A, second drive pin 341B, third drive pin 341C, fourth drive pin 341D is now positioned respectively at the level of the other end of the first actuation slot 332A, second actuation slot 332B, third actuation slot 332C, fourth actuation slot 332D, in relation to that in which they are shown in FIG. 2A. As a result, an even larger part of the rollers, i.e., the first roller 34A, second roller 34B, third roller 34C, fourth roller 34D, protrudes towards the inside of the cylindrical frame 8 to perform the adjustment function of the diameter of the guide channel 10 while maintaining its centre C.

Figure 3A:
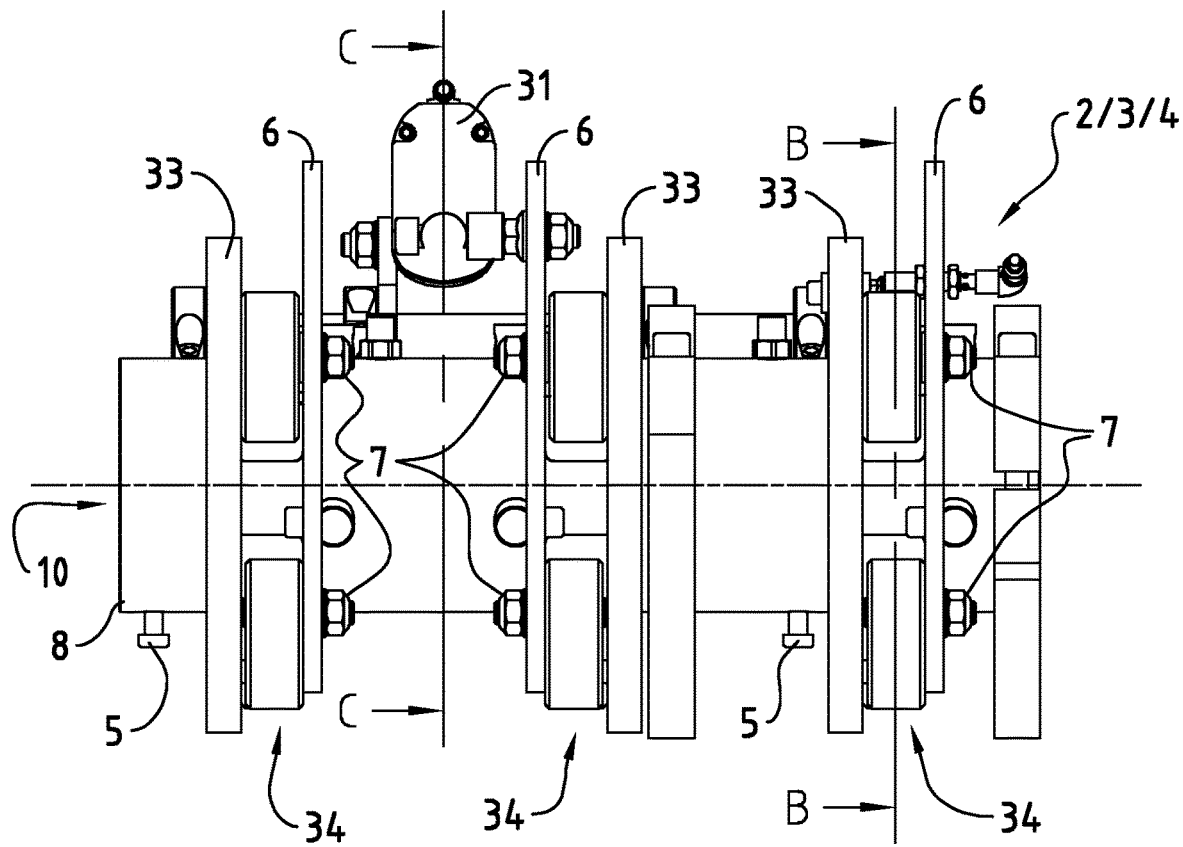
FIG. 3A shows a side view of the adjustment device according to the preferred embodiment illustrated by the preceding drawings.
Figure 3B:
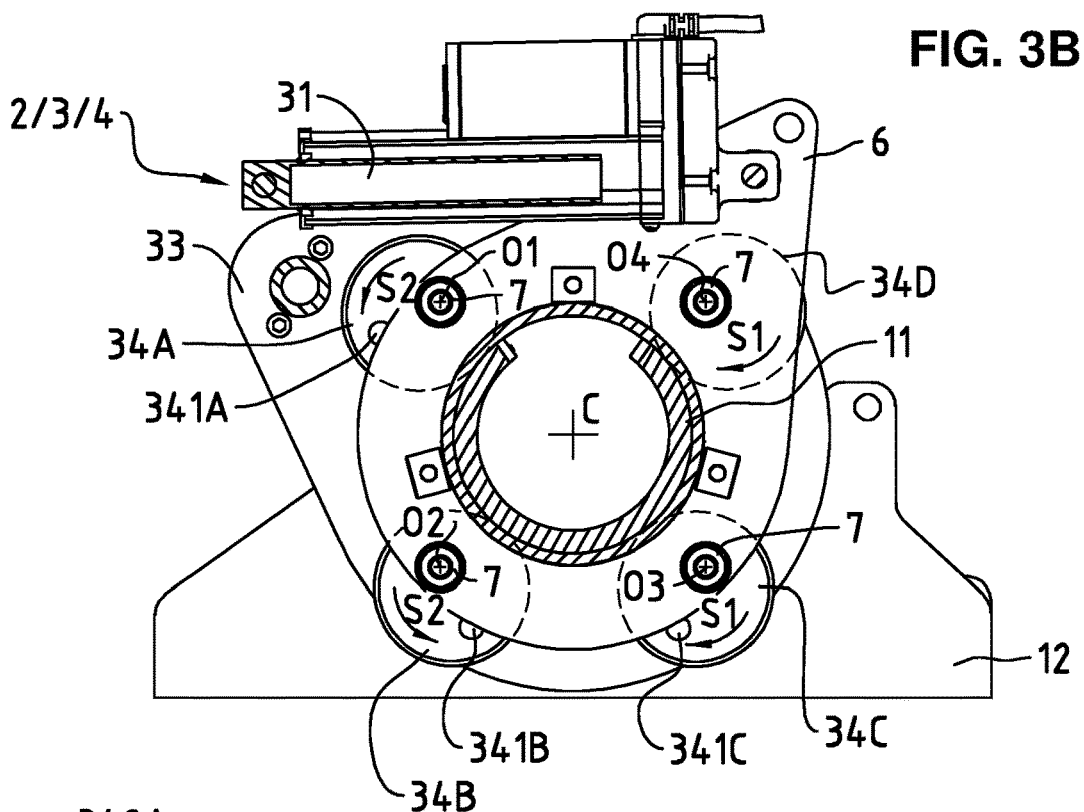
FIGS. 3B and 3C are a sectional view along a plane perpendicular to the guide axis traversing the piston and a series of rollers, respectively.
Figure 3C:
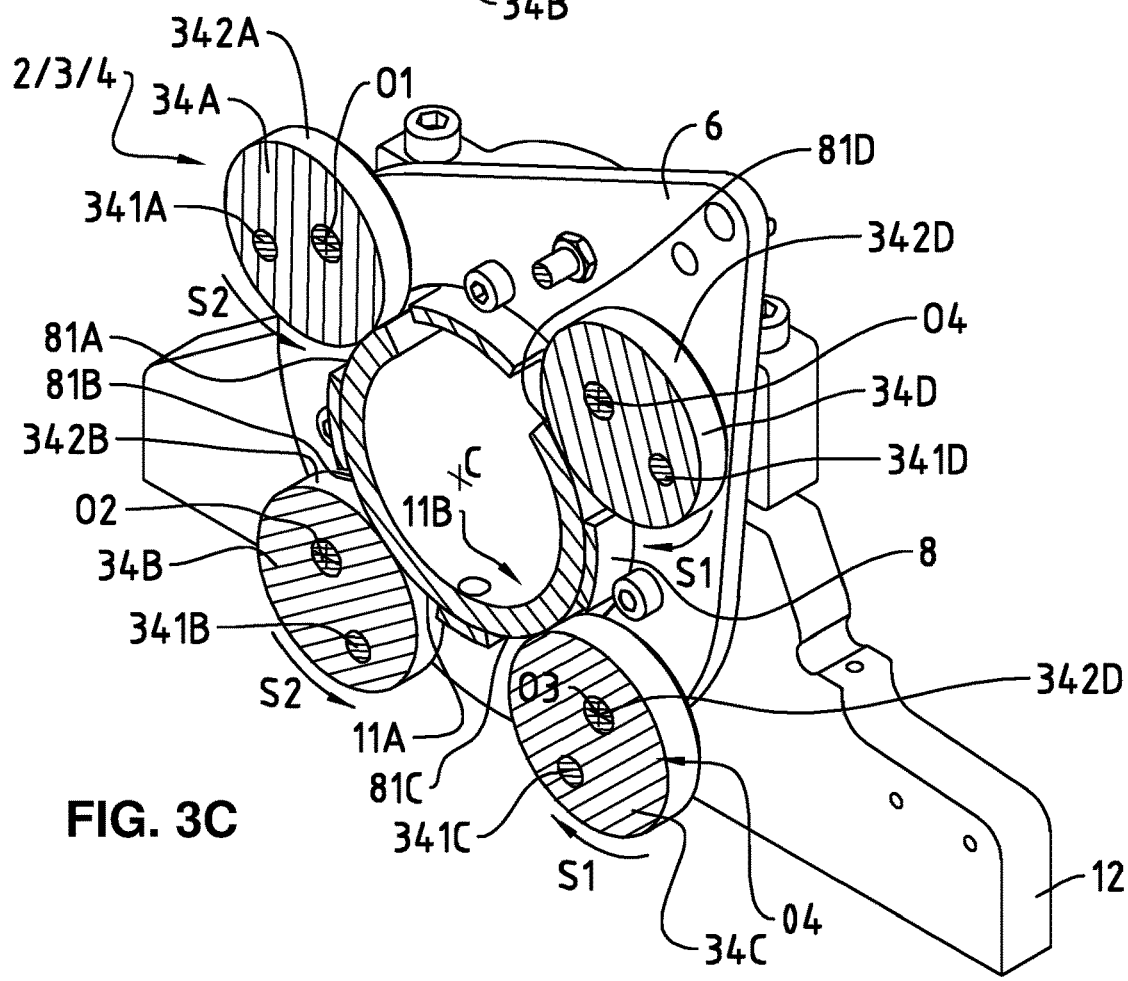

FIGS. 3A, 3B and 3C below are intended to explain in greater detail the arrangement of the device for adjustment of the diameter of the guide channel 2 according to the preferred embodiment described with the aid of the drawings above, and in particular how this device can jointly perform the size adjustment of the guide channel, while maintaining of the roundness of its shape, as well as its centre C thanks to the rollers 34 used as clamping eccentrics compressing the flexible guide shell 11. FIG. 3A shows a side view of the device for adjusting the diameter of the guide channel 2 according to the preferred embodiment illustrated in particular by FIG. 1, and on which the cylindrical frame has openings (not shown in FIG. 3A, but illustrated in FIG. 3C) at three distinct stages where the different series of rollers 34 actuated by their respective drive cam 33 are arranged. The rollers are here of cylindrical shape and are attached to an anchoring piece 6 and mounted movably in rotation around axes that are off-centre with respect to the centres of the rollers, the ends of which are threaded and integral with anchor piece 6 with the aid of nuts 7. In all the drawings below, the guide channel 10 is shown in the first position P1 corresponding to the maximum bar diameter $D_{Max}$; in this position, the flexible guide shell 11 rests against the cylindrical frame 8. In FIG. 3A, two cutting planes perpendicular to the guide axis traversing respectively the piston (cutting plane B-B) and a series of rollers (cutting plane C-C) are shown. FIGS. 3B and 3C show views along these cutting planes, respectively.

In FIG. 3B corresponding to cutting plane B-B traversing the actuation piston 31, the respective position of the axes of rotation of each of the rollers, where the nuts 7 are located, can be seen:

The first axis of rotation O1 of the first roller 34A
The second axis of rotation O2 of the second roller 346
The third axis of rotation O3 of the third roller 34C, and finally
The fourth axis of rotation O4 of the fourth roller 34D.

Although only the first drive pin 341A of the first roller 34A, the second drive pin 341B of the second roller 34B, and the third drive pin 341C of the third roller 34C are shown in FIG. 3B, the fourth drive pin 341D of the fourth roller 34D can also be seen in addition to the aforementioned ones in FIG. 3C corresponding to the cutting plane C-C traversing the rollers 34.

Both FIGS. 3B and 3C show the directions of rotational actuation of each of the rollers 34 during an operation to adjust the diameter of the guide channel 10, and it can be seen that the rollers located on the left of the flexible guide shell 11, i.e. the first roller 34A and the second roller 34B, are actuated in rotation anticlockwise (second direction of rotation S2), while the third roller 34C and the fourth roller 34D are instead driven clockwise (first direction of rotation S1). In other words, according to the arrangement proposed for the device for adjustment of the diameter of the guide channel 2, although all the above-mentioned drive pins 341A,341B,341C,341D are driven in the same direction of rotation—i.e. the first direction of rotation S1 shown in FIG. 2B in particular—in their respective actuation slots 332A, 332B,332C and 332D. Therefore this means the solution implemented for adjustment is made not only simple, but also very intuitive, since the rollers exert a compression force on the outer surface 11A of the flexible guide shell 11 towards the inside and symmetrically in such a way that it deforms in the manner of an optical diaphragm around its centre C. In addition, the adjustment is very gradual and very smooth thanks to the use of rollers 34 as clamping eccentrics, whose outer surfaces act as a compression element by resting against the outer surface 11A of the flexible guide shell 11.

FIG. 3C, in cutting plane C-C of a series of rollers 34, shows the four openings (first opening 81A, second opening 81B, third opening 81C, fourth opening 81D) in the cylindrical frame 8 for the passage respectively of the first roller 34A, second roller 34B, third roller 34C and fourth roller 34D. Each of the first outer surface 342A of the first roller 34A, the second outer surface 342B of the second roller 34B, the third outer surface 342C of the third roller 34C and the fourth outer surface 342D of the fourth roller 34D rests against the outer surface 11A of the flexible guide shell to perform jointly a function of clamping and of height adjustment, or here, rather, height maintenance. Thus, as shown in most of the drawings, the device for adjustment of the diameter of the guide channel 2 acts simultaneously, under the action of the actuation piston 31 alone, as clamping system 3 and height adjustment system 4 via rollers 34.

FIGS. 4A, 4B and 4C show respectively a side, front and top view of a flexible guide shell 11 taken in isolation from the bar feeder, and which is used according to a preferred embodiment of the present invention to further improve the guiding properties. As can be seen in FIG. 4A, the flexible guide shell 11 has an upper opening 11D in the rest position, and his upper opening does not show a straight edge, but on the contrary a corrugated profile 11E is arranged on it, in such a way that the bars guided by the inner surface 11B of the flexible guide shell 11 cannot be brought into contact with an edge, but simply wrapped without coming into contact with a protruding edge. This corrugated profile, shown in FIG. 4C, allows vibrations and shocks to be reduced, in such a way that the guiding properties are improved even further in relation to the usual guide channels.

Furthermore, it can be seen in FIGS. 4A and 4C that at least one lower insertion hole 11C, and preferably several, are arranged at the base of the flexible guide shell 11, so that fastening parts such as the retaining pins 5 shown in the previous drawings can be inserted in them, so as to ensure that the upper opening 11D always remains in the same orientation position with respect to the cylindrical frame 8 and cannot be shifted sideways or, worse, downwards. The retaining pins 5 are, however, intended to allow a degree of freedom in translation vertically so that the base of the flexible guide shell 11 can move slightly upwards when the flexible guide shell 11 is clamped, so that the reduction in the diameter of the guide channel 10 does not affect its centre C, which always remains aligned with the guide axis A-A.

In FIG. 4B, it can be seen that the angular sector a measured from the centre C of the flexible guide shell 11 (corresponding to the centre C of the guide channel 10 once it is mounted) is preferably comprised between 60° and 90°, and even more preferably between 70° and 80° so that the elastic deformations are not too significant when an adjustment is made, while maximising the complementary angular sector over which the guide envelope formed by the flexible guide shell 11 stretches. This way, a calibrated adjustment is preferably carried out which allows bars to be guided over a diameter range of about 20 mm apart, while at the same time providing the best possible guiding properties.

Figure 5A:
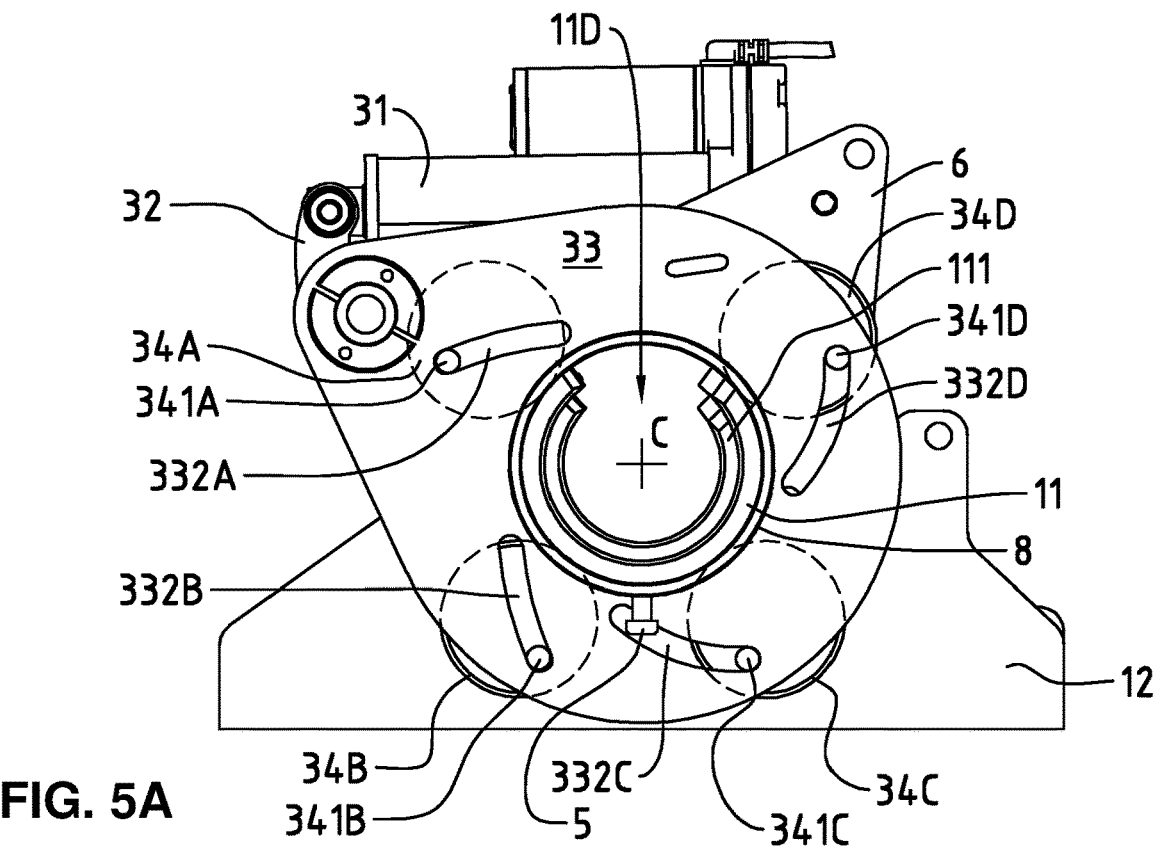
FIGS. 5A and 5B illustrate respectively a guide channel obtained by adding one or respectively two compensation inserts.
Figure 5B:
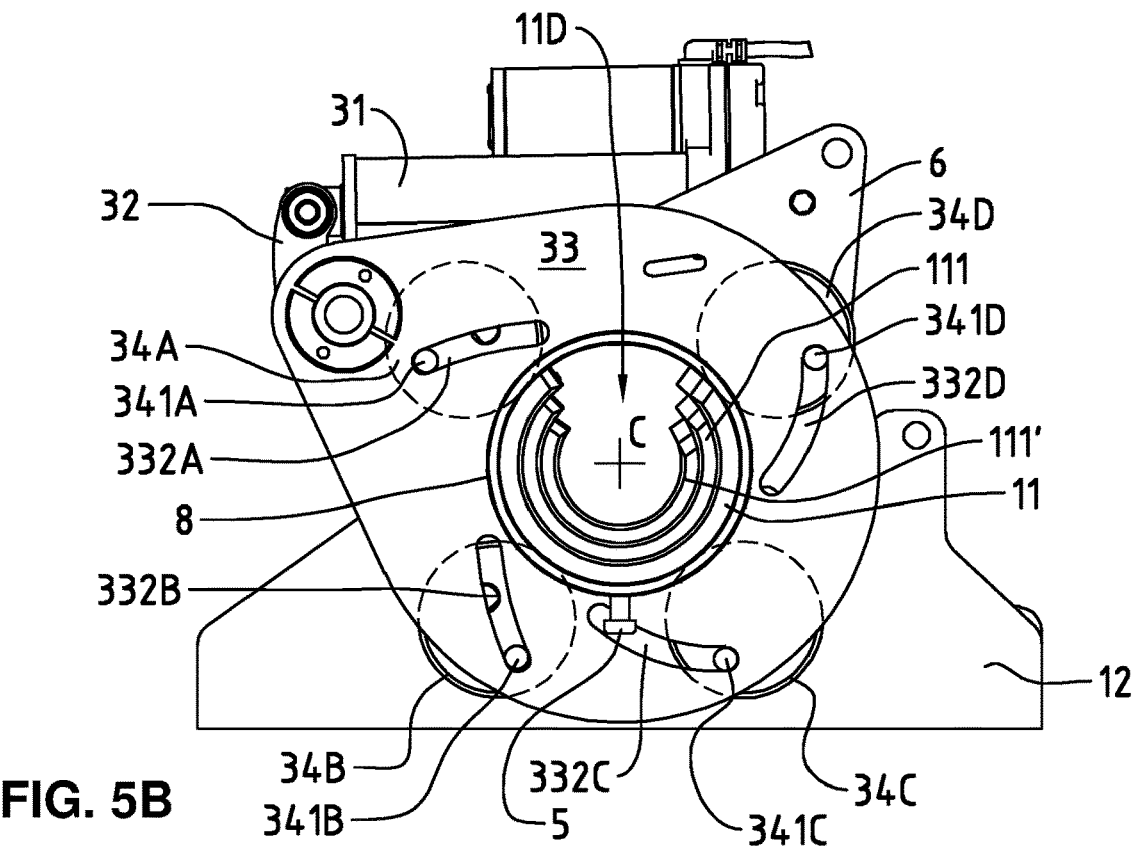

In order to increase the range of adjustment for other diameter values, compensation inserts are preferably used as part of the present invention, as shown in FIGS. 5A and 5B.

FIGS. 5A and 5B show a device for adjusting the diameter of guide channel 2 in the same position (first position P1, corresponding to a maximum bar diameter $D_{Max}$) and with the same elements as those shown in FIG. 2A, and whose common reference numerals will therefore not be explained again. The only difference between FIG. 2A and FIG. 5A consists of the addition of the first additional guide insert 111 inside the flexible guide shell 11. Such an addition allows the maximum bar diameter value to be shifted to a value about 20 mm lower than that available according to the arrangement in FIG. 2A, i.e. corresponding to the minimum bar diameter $D_{Min}$ obtained using the setting shown in FIG. 2C having a fully closed guide channel in the second position P2. It is then possible to carry out in turn an adjustment by clamping, potentially up to a new value of minimum bar diameter $D_{Min1}$ 20 mm smaller in relation to the previous minimum bar diameter $D_{Min}$. Similarly, in FIG. 5B, a second additional guide insert 111' is added on the first additional guide insert 111 in order to obtain an adjustment on a new range of value of supplementary diameters shifted by 20 mm in relation to that corresponding to FIG. 5A. Therefore, according to this preferred embodiment, it is possible to line up and to add, as a function of the number of inserts used, at least three adjustment ranges of 20 mm, i.e. a total adjustment range of 60 mm can be achieved, while maintaining a suitable service life of the system and optimum guiding properties, whereby the angular sector a corresponding to the upper opening 11D of each additional guide insert is only slightly increased as the layers are added. In addition, the same retaining pin 5 can be used for each of the desired adjustment ranges to provide a maximum degree of scalability and of flexibility.

The person skilled in the art will understand that the preferred embodiment described above is given only by way of an example, and should not be interpreted in a restrictive way as far as the scope of protection of the present invention is concerned. It is thus possible, without departing from the scope of the present invention, to use other actuation mechanisms for regulating the diameter, using for example other forms of rollers (elliptical section in place of round like the cylinders illustrated), to produce the clamping eccentrics, other forms of actuation slots, a different number of rollers and corresponding slots, etc. In addition, it is also conceivable to use a flexible guide shell whose shape at rest would be completely closed, and an adjustment mechanism allowing an increase in the channel diameter by spreading out instead of the previously described clamping to reduce it, or another type of adjustable guide element to make the channel with adjustable diameter.

It is likewise possible, without departing from the scope of the present invention, to use actuation devices other than rollers and cams to carry out the adjustment of the diameter of the guide channel, such as, for example, hydraulic cylinders, electric motors or pneumatic pistons acting directly on the flexible guide shell so as to give it different shapes, which would yet always remain concentric around the invariable guide axis A-A.

Therefore, the device for adjusting the diameter of the guide channel claimed may comprise other types of mechanisms in order to achieve the adjustment function conferred by the clamping device 3 described. For example, a variable number of cylinders can be foreseen, preferably oriented in a star shape and all directed towards the centre C of the guide channel, which remains constant whatever the diameter of the bars to be guided. In addition, according to the preferred embodiment described and illustrated in the preceding drawings, the adjustment of the diameter is carried out by clamping, which jointly carries out a height adjustment in order to maintain the centre C of the bar guide channel and thus function by way of a diaphragm around the invariable guide axis A-A. In other words, the device for adjustment of the diameter of the guide channel 2 is then combined with the clamping device 3 and the height adjustment system 4, which are all carried out simultaneously by the same parts.

Likewise, a variant embodiment could also be foreseen according to which the diameter adjustment function would be performed by pinching the top of the flexible shell, with cylinders acting on its its upper end where the opening is arranged, while the height adjustment would be performed through a completely dissociated actuation mechanism that does not act on the diameter of the guide channel at all. For example, it could be an independent cylinder designed to adjust the height of a plate with which the shell is integral, or again actuating "Toblerones" whose movement towards and away would have the effect of lowering or raising respectively the base of the flexible guide shell. In this way, by synchronously managing the height adjustment in relation to the degree of opening or of closing of the guide channel, it is possible to create a diameter adjustment mechanism which would still have a clamping device for this purpose, but no longer have an integrated height adjustment device. Instead, the height adjustment device would be provided separately.

The invention claimed is:

1. Bar feeder comprising a guide channel centred on an invariable guide axis, wherein the guide channel is adjustable and is formed by an adjustable guide element, said adjustable guide element being configured to define a diameter of said guide channel of constant centre corresponding to a bar diameter between a maximum bar diameter ($D_{Max}$) in a first position of the adjustable guide element and a minimum bar diameter ($D_{Min}$) in a second position of the adjustable guide element under action of a device for adjusting the diameter of the guide channel.

2. Bar feeder according to claim 1, wherein the adjustable guide element is a flexible guide shell configured to envelope a bar within said guide channel.

3. Bar feeder according to claim 1, wherein the device for adjusting the diameter of the guide channel comprises a clamping device acting on an outer surface of said flexible guide shell.

4. Bar feeder according to claim 3, wherein the clamping device comprises pivoting rollers resting on said outer surface of said flexible guide shell, a position of said rollers defining the diameter of the guide channel and the corresponding bar diameter.

5. Bar feeder according to claim 4, the clamping device further comprising an actuation piston acting on a drive cam for the rollers.

6. Bar feeder according to claim 5, said drive cam being provided with a plurality of actuation slots co-operating with corresponding drive pins provided on each of said rollers.

7. Bar feeder according to claim 5, a number of rollers of said clamping device being even, and the drive cam of said rollers being arranged to drive in rotation half of said rollers in a first direction of rotation and a second half of said rollers in a second direction of rotation opposite to said first direction of rotation.

8. Bar feeder according to claim 1, said device for adjusting the diameter of the guide channel further comprising an integrated height adjustment system.

9. Bar feeder according to claim 8, said clamping device comprising at least three rollers and being arranged to jointly constitute said height adjustment system.

10. Bar feeder according to claim 2, wherein said guide channel is further provided with a retaining pin inserted at a base of said flexible guide shell.

11. Bar feeder according to claim 2, wherein an angular sector over which an upper opening of said flexible guide shell extends in said first position corresponding to the maximum bar diameter is between 60 degrees and 90degrees.

12. Bar feeder according to claim 2, a gap between the maximum bar diameter ($D_{Max}$) in said first position and the minimum bar diameter ($D_{Min}$) in said second position corresponding to a range of around 20 mm, and an additional guide insert being configured to be inserted in said flexible guide shell to define a new range of minimum and maximum diameter.

13. Bar feeder according to claim 2, an upper opening of said flexible guide shell having a profile allowing reciprocal interlocking.

14. Bar feeder according to claim 13, said profile of the upper opening of said flexible guide shell being a corrugated profile.

* * * * *